No. 869,713. PATENTED OCT. 29, 1907.
P. JENNESS.
CLUTCH MECHANISM.
APPLICATION FILED SEPT. 12, 1905.

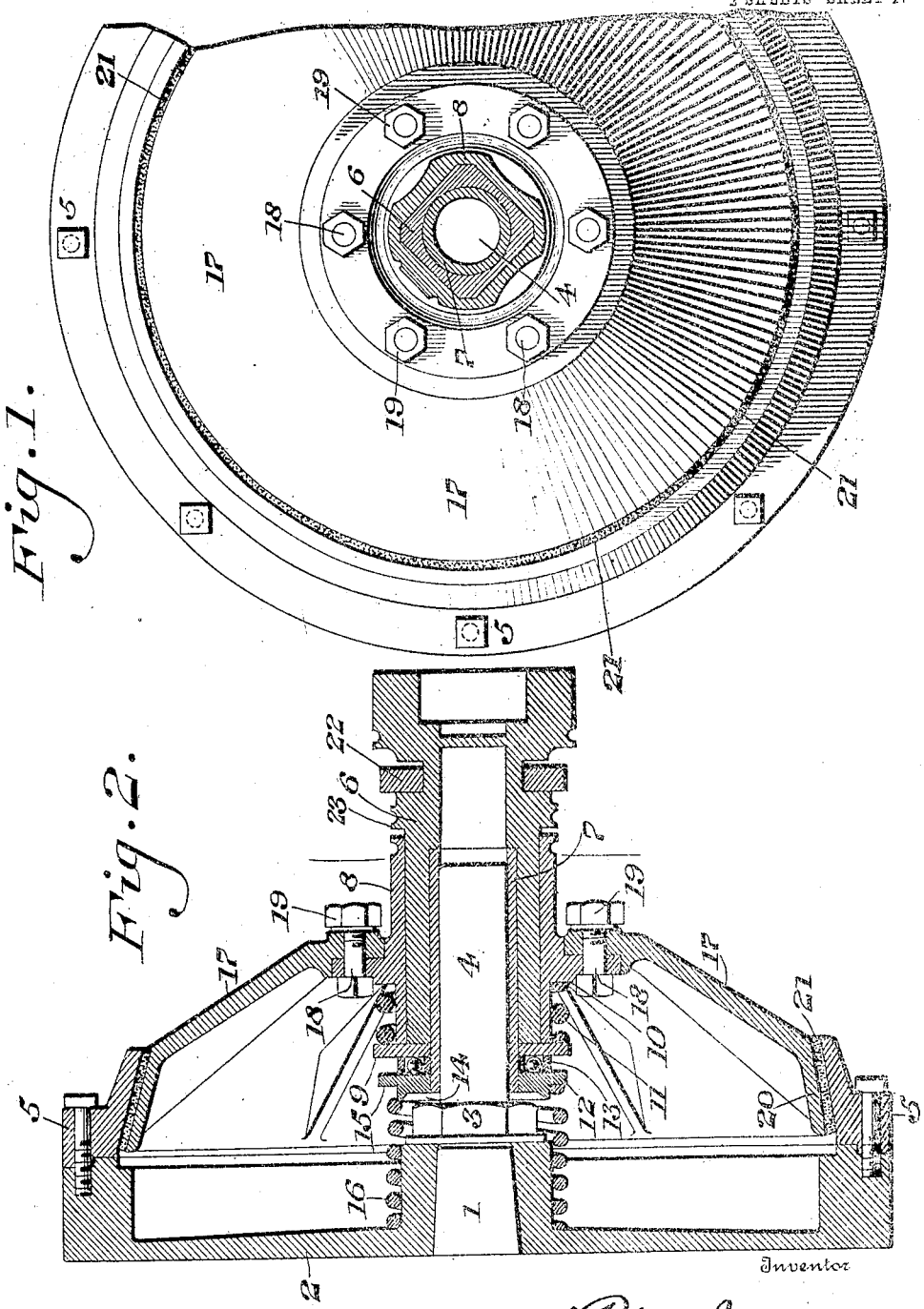

2 SHEETS—SHEET 2.

Witnesses
P. F. Nagle.
L. Douville.

Inventor
Peter Jenness.
By Wiedersheim Fairbanks
Attorneys

UNITED STATES PATENT OFFICE.

PETER JENNESS, OF PHILADELPHIA, PENNSYLVANIA.

CLUTCH MECHANISM.

No. 869,713.  Specification of Letters Patent.  Patented Oct. 29, 1907.

Application filed September 12, 1905. Serial No. 273,075.

*To all whom it may concern:*

Be it known that I, PETER JENNESS, a citizen of the United States, residing in the city and county of Philadelphia, State of Pennsylvania, have invented a new and useful Clutch Mechanism, of which the following is a specification.

My invention consists of a novel construction of a friction clutch in which means are provided to overcome and reduce to a minimum, the sudden shock which is produced in the ordinary friction clutches when the movable clutch member first engages with the rotatable member.

It further consists of other novel features of construction, all as will be hereinafter fully set forth.

Figure 3:
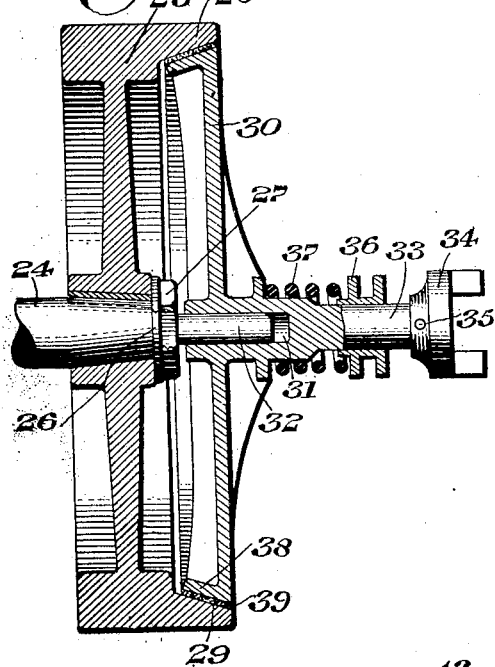
Figure 4:
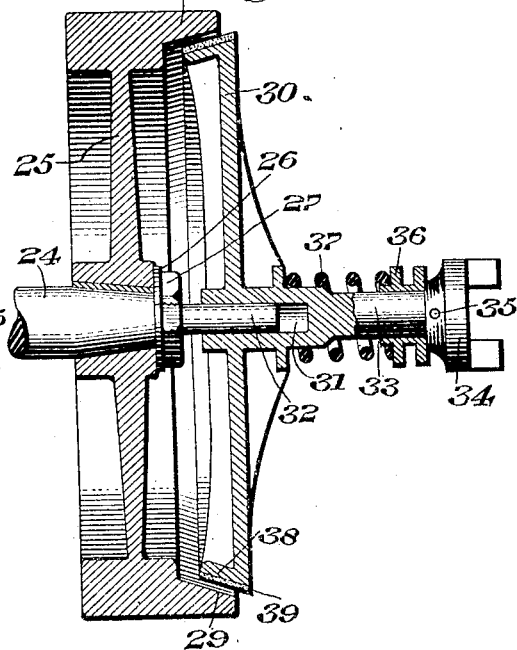
Figure 5:
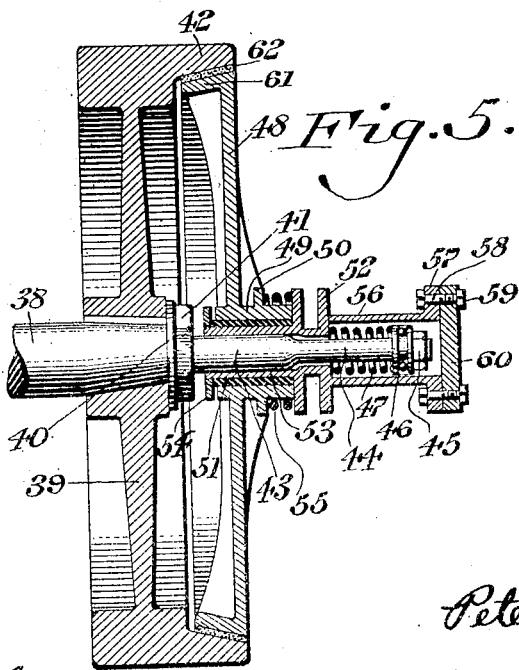

Figure 1 represents a plan view of a friction clutch embodying my invention, showing the same in assembled position. Fig. 2 represents a sectional view thereof. Fig. 3 represents a sectional elevation of a modified form of clutch mechanism showing the two members in engagement. Fig. 4 represents a sectional elevation similar to Fig. 3 but showing the clutch members as being disengaged. Fig. 5 represents a sectional elevation of another embodiment of my invention.

Similar numerals of reference indicate corresponding parts in the figures.

Referring to the drawings, 1 designates the driving shaft having fixedly mounted thereon a fly wheel 2 by any suitable means such as a nut 3 having engagement with the shaft 1.

4 designates an extension or prolongation of the shaft 1.

5 designates a bearing forming one member of the clutch which may be integral with the fly wheel or secured thereto in any desired manner, the bearing face being preferably cone shaped.

6 designates a sleeve provided with a bushing 7 and loosely mounted upon the extension 4 of the shaft 1. The bushing 7 is preferably made of bronze or other suitable material and has a driving fit in the sleeve 6, it being noticed that the bushing extends outwardly beyond the end of said sleeve, the purpose of which will be hereinafter described. The sleeve 6 is squared so as to receive a collar 8. This will prevent the rotation of the collar with respect to said sleeve 6 but will permit its longitudinal movement on said sleeve.

9 designates a washer or ring loosely mounted on the bushing 7.

10 designates an abutment on the collar 8 between which and the washer 9 is interposed a buffer spring 11.

12 designates a collar loosely mounted on the bushing 7 between which and the washer 9 is the cage or washer 13 provided with ball bearings. The washer 12 is recessed as at 14 adapting the same to partly cover the nut 3, when the clutch mechanism is disengaged, and thus shortens the length of the clutch mechanism so that it will occupy less space on the machine.

15 designates an annular recess or groove between which and the casing of the fly wheel 2 is interposed a spring 16 which tends to normally retain the clutch members in engagement. 17 designates the movable member of the friction clutch which may be integral with the collar 8 or suitably secured thereto by any suitable means such as bolts 18 and nuts 19, said clutch member being provided at its end with cone shaped surfaces 20 to which is suitably secured by rivets or equivalent devices, any suitable friction material such as leather or the like. The sleeve 6 is provided with an annular groove adapted to retain a clutch collar 22 to which the actuating lever is secured.

The operation is as follows:—Having the parts in the position seen in Fig. 2, it will be seen that the spring 16 tends normally to retain the clutch members in frictional engagement, the movement to the right of the movable clutch member 17 being regulated by means of the washer 9 which abuts against the inner end of the collar 8 and thus preventing any further movement in that direction. When it is desired to disengage the clutch, the sleeve 6 is moved forwardly or to the left, said sleeve sliding within the collar 8 until a flange 23 thereon engages the outer end of the collar 8 whereupon the clutch member 17 will be moved inwardly or to the left. The spring 16 will be gradually compressed and the tension of the spring 11 will be released. It will be seen that when the sleeve 6 is shifted to unset the clutch the spring 11 is at first allowed to expand, and the spring 16 compressed until the shoulder 23 engages with the end of the sleeve 8, and thus limits any further expansion of the spring 11. When the sleeve 6 is permitted to move rearwardly or to the right, the friction material 21 will engage the cone bearing of the clutch member 5 but instead of the usual abrupt engagement the buffer spring 11 interposed between the washer 9 and its abutment 10 on the collar 8 will cause the said bearings to engage with each other, at first very gradually and thus with a very slight pressure. This pressure depending entirely upon the strength of the spring 11 gradually increases until the washer 9 abuts against the inner end of the sleeve 6 and the inner end of collar 8, when it will be seen that the full tension of the spring 16 will be employed to retain the clutch members in engagement with each other. It will thus be seen that when the clutch is being set, the spring 16 is allowed to expand and the spring 11 is gradually compressed until the friction faces of the clutch engage with each other. It will be seen that by the use of this novel construction the sudden shock and jar which usually occurs when the clutch members first engage with each other is entirely avoided, as the bearing surfaces approach each other very gradually at first, owing to the fact that the spring 16 which tends to always automatically hold the clutch members in ...agement must first overcome the tension of the s[prin]g 11 before said clutch members are locked in engagement.

In the embodiment shown in Figs. 3 and 4, I have shown the movable clutch member as being mounted directly upon the driving shaft and only one resilient member employed to overcome the initial shock of the engagement of the clutch members. In these embodiments 24 designates the driving shaft which has keyed thereto a fly wheel 25 and is provided with a washer 26 and a nut 27. The outer flange 28 of the fly wheel 25 is internally beveled as seen at 29, this bevel inclining outwardly toward the outer edge of the flange 28. 30 designates the movable clutch member which is centrally recessed as seen at 31 and thus adapted to be loosely mounted on the reduced end 32 of the driving shaft 24. The axle or hub of the movable member 30 is extended or prolonged as seen at 33 and has secured thereto a clutch collar 34 by any suitable means such as a pin 35. Loosely mounted on the rod or extension 33 is an actuating collar 36 which is normally maintained in its outer position at the right hand end of the rod 33, as seen in Fig. 4, by means of a spring or resilient member 37 interposed between said actuating collar 36 and the hub of the clutch member 30. The hub of the member 30 and the actuating clutch collar 36 are suitably faced off or otherwise adapted to serve as an abutment for the ends of the resilient member 37. The movable clutch member 30 is provided with an annular flange or ring 38 suitably beveled and provided with suitable friction material 39.

The operation will be readily apparent. Having the parts in their initial or normal position as seen in Fig. 4, the actuating collar, which in practice would be connected with a suitable lever, is moved towards the left and owing to the interposition of the spring 37 between the actuating collar 36 and the hub of the fly wheel or fixed clutch member 25, the clutch member 30 will yieldingly engage the friction surface of the fixed clutch member 25.

When it is desired to disengage the clutch, the collar 36 is moved to the right which will permit the spring 37 to assume its normal position and the movable clutch member to move out of engagement with the fixed clutch member. In the embodiment shown in Fig. 5, 38 designates the driving shaft having keyed thereon a fly wheel 39 and provided with a washer 40 and a nut 41. 42 designates a flange or annular ring on the fixed member 39.

The inner or operative face of the flange 42 is suitably beveled or inclined. 43 designates a prolongation of the shaft 38 but having a reduced diameter and having extending therefrom a rod 44, the diameter of which is still further reduced.

45 designates a nut secured to the end of the rod 44. 46 designates ball bearings loosely mounted on the said rod and against which one end of a spring 47 abuts. 48 designates a movable clutch member provided with a hub 49 having an annular flange 50.

51 designates a bushing which has preferably a driving fit in hub 49 and extends beyond the inner end of the hub.

52 designates the actuating clutch which is mounted on the reduced portions 43 and 44 of the shaft. This actuating clutch would preferably be made integral and has a collar or sleeve 53 which is mounted on the reduced end 43 of the shaft, on which is mounted the movable clutch member 48. Suitably secured at the inner end of the sleeve 53 is a washer 54 which engages the bushing 51. Interposed between the flange 50 and the clutch collar is a spring or resilient member 55. Extending outwardly from the clutch is a sleeve or ring 56 within which the reduced end 44 of the shaft and the ball bearings 46 and spring 47 are carried. The spring 47 is interposed between the ball bearings 46 and the clutch collar 52. The outer end of the sleeve or collar 56 is provided with an annular flange 57 to which is secured by means of bolts 58 and nuts 59 any suitable actuating lever or connection as 60.

The operation is as follows:—Having the clutch in engagement as seen in Fig. 5, the clutch collar 52 will be moved to the right which will permit the spring 55 to be released from its tension and the cone-shaped flange 61 provided with friction material 62 will be permitted to move out of engagement with the inner bevel of the flange 42 which is secured to the fixed clutch member 39. As seen in Fig. 5, after the movable clutch member is partially released the washer 54, which is fixed to the sleeve 53, will abut against the inner end of the hub 49 and the movable clutch member will be moved outwardly in a positive manner against the tension of the spring 47 which is mounted on the reduced neck 44 of the shaft 38.

My novel construction may be very cheaply built and is very durable and efficient in its action.

It will be apparent that the strength of the spring 16 and the spring 11 must have a certain proportion in order to obtain the desired result. The springs 11 and 16 are of such proportion that when the friction faces begin to engage they contact with each other under the initial pressure of the spring 11. The pressure of this spring 11 gradually increases as the sleeve (6) is allowed to recede to the right until the collar or sliding member (8) abuts against the washer (9) when, as the sleeve (6) is still allowed to recede, the frictional surfaces (20) and (21) are forced together with the full pressure of the spring 16, it being apparent that the spring 16 always tends to move the sleeve 6 to the right. It is also apparent that the driven member always has a certain relation to the driving member owing to the cone-shaped face of said driving member which, as will be seen in Fig. 2, inclines inwardly. It will thus be seen that the driven member 17 when it disengages from the driving member, always moves inwardly or to the left as seen in Fig. 2 and is thus always retained within said driving members. It will be evident that I may vary the strength of either the spring 16 or the spring 11 according to the requirements and that I preferably employ a shorter spring for the spring 11 than I do for the spring 16.

It will be evident that various changes may be made by those skilled in the art which may come within the scope of my invention and I do not therefore desire to be limited in every instance to the exact construction herein shown and described.

Having thus described my invention, what I claim as new and desire to secure by Letters Patent, is:—

1. In a friction clutch, a driving member, a driven member normally held in engagement therewith, endwise compressible yielding means for holding said members in engagement, and a single endwise compressible yielding means coaxial with the shafts of said members for moderating the initial engagement thereof, said yielding means being continuously opposed to each other and both acting to set the clutch.

2. In a friction clutch, a driving shaft, a clutch member fixed thereon, a driven member loosely mounted on said shaft and having longitudinal movement thereon, a spring coaxial with the shaft of one member for holding said members in engagement, a second spring coaxial with the shaft of said members and interposed between the driving member and the point of application of the clutch lever to moderate the initial shock of such engagement, said springs being disposed in line with each other about the shafts of said members and being continuously opposed to each other and both acting to set the clutch.

3. In a friction clutch, a driving member, a driven member, adapted to be moved in engagement therewith, a sleeve on which said driven member is mounted, a bushing in said sleeve, washers loosely mounted on said bushing, ball bearings between said washers, a spring acting against one of said washers and adapted to hold said driven member in engagement with said driving member and a buffer spring engaging the other of said washers and adapted to moderate the initial shock of said engagement.

4. In a friction clutch, a driving shaft, a fly wheel, rigidly mounted thereon, a cone face on said fly wheel, a sleeve loosely mounted on said shaft, a bushing having a driving fit with said sleeve and extending outwardly beyond the end thereof, a driven clutch member non-rotatably mounted with respect to said sleeve but having longitudinal movement thereon, a washer loosely mounted on said bushing, and a spring interposed between said driven member and said washer adapted to moderate the initial engagement of said clutch members and means for normally retaining said clutch members in engagement.

5. In a friction clutch, a driving member, a driven member, means for retaining said members in engagement, a sleeve on which said driven member is mounted, a bushing in said sleeve, a washer mounted on said bushing, a second washer mounted on said bushing, ball bearings between said washers, said first washer limiting the engagement of said members and means for moderating the initial shock of said engagement.

6. In a friction clutch, a driving member, a driven member, a sleeve on which the latter is mounted, and on which said member has longitudinal movement, a bushing in said sleeve, a washer mounted thereon and adapted to limit the movement of said driven member in one direction, a flange on said sleeve adapted to engage the other end of said driven member to limit its longitudinal movement in the opposite direction, yielding means for normally holding said members in engagement and a spring adapted to moderate the initial shock of said engagement.

7. In a friction clutch, a driving member having a cone shaped face, a driven member adapted to frictionally engage said face, a sleeve on which said driven member has longitudinal movement, a flange on said sleeve adapted to limit the inward movement of said sleeve, a bushing in the latter, a washer loosely mounted on said bushing, a second washer loosely mounted on said bushing, means engaging said second washer for normally retaining said members in engagement, a recess in said second washer and a buffer spring interposed between said first washer and said driven member and adapted to moderate the initial engagement of said members.

8. In a friction clutch, a driving shaft, a clutch member fixed thereon, a driven member loosely mounted on said shaft and having longitudinal movement thereon, a spring coaxial with the shaft of one member for holding said members in engagement, a buffer spring coaxial with the shafts of said members and interposed between the driving member and the point of application of the clutch lever to moderate the initial shock of such engagement, said springs being disposed in line with each other about the shafts of said members, and said springs being disposed between the points of attachment of said members with their shafts.

9. In a friction clutch, a driving member having a single frictional surface, a driven member having a single frictional surface, and two springs coaxial with each other and coacting with said members, both of said springs tending to normally hold said members in engagement and one spring being released when the other is compressed.

10. In a friction clutch, a driving shaft, a clutch member fixed thereon, a driven member loosely mounted on said shaft, a clutch member mounted on said driven member and having longitudinal movement on said driven member, and two continuously opposed springs coaxial with the shaft for normally holding said clutch members in engagement.

PETER JENNESS.

Witnesses:
H. S. FAIRBANKS,
W. F. JACKSON.